United States Patent [19]

Fischer

[11] 4,028,857

[45] June 14, 1977

[54] METHOD AND ARRANGEMENT FOR MOUNTING AN OBJECT AT A DISTANCE FROM A SUPPORT STRUCTURE

[76] Inventor: Artur Fischer, Weinhalde 34, D-7241 Tumlingen Gde. Waldachtal, Germany

[22] Filed: Apr. 8, 1976

[21] Appl. No.: 675,053

Related U.S. Application Data

[63] Continuation-in-part of Ser. No. 616,072, Sept. 23, 1975.

[30] Foreign Application Priority Data

| Sept. 26, 1974 | Germany | 2445897 |
| Apr. 12, 1975 | Germany | 2516015 |
| Apr. 22, 1975 | Germany | 2517761 |
| Sept. 10, 1975 | Germany | 2540197 |

[52] U.S. Cl. .................. 52/309.2; 52/508; 52/704; 52/744
[51] Int. Cl.² .............. E04B 1/56; E04B 1/40
[58] Field of Search ............ 52/744, 704, 698, 508, 52/513, 302, 309

[56] References Cited

UNITED STATES PATENTS

| 2,633,735 | 4/1953 | Dondero | 52/698 X |
| 3,204,416 | 9/1965 | Williams | 52/698 X |
| 3,282,015 | 11/1966 | Rohe et al. | 52/704 |
| 3,532,316 | 10/1970 | Mathes | 52/744 X |

FOREIGN PATENTS OR APPLICATIONS

| 789,416 | 8/1935 | France | 52/513 |
| 2,158,627 | 3/1973 | Germany | 52/513 |
| 2,225,667 | 12/1973 | Germany | 52/508 |

*Primary Examiner*—Alfred C. Perham
*Attorney, Agent, or Firm*—Michael J. Striker

[57] ABSTRACT

A method and an arrangement for mounting an object at a distance from a support structure formed with an anchoring hole employ an anchoring member having a leading anchoring portion received in the hole and a trailing elongated mounting portion extending outwardly of the hole. The anchoring portion is fixed within the hole by mounting a cap member therein and about the anchoring member so as to fix the latter in position. A flow-through passage is provided either in the cap or in an interior bore of the anchoring member so that a hardenable substance can be injected through the passage. The exterior of the anchoring portion forms a clearance in the hole which is in communication with this passage. Thereby, the hardenable substance fills the clearance and anchors the anchoring member upon hardening of the substance. The object is mounted on the mounting portion of the anchoring member by two tapped nuts which threadedly engage an exterior thread formed on the free end of the mounting portion. The object is positioned at a predetermined distance from the support structure by one of the nuts and held in position at this particular predetermined distance by the other nut. The nuts may engage opposite sides of the object to be mounted, or may engage each other.

16 Claims, 4 Drawing Figures

4,028,857

METHOD AND ARRANGEMENT FOR MOUNTING AN OBJECT AT A DISTANCE FROM A SUPPORT STRUCTURE

CROSS-REFERENCE TO RELATED APPLICATIONS

The present application is a continuation-in-part application of the application having Ser. No. 616,072, filed Sept. 23, 1975, by the applicant, and having the title "Method and Arrangement for Mounting an Object to a Low Strength Support Structure."

BACKGROUND OF THE INVENTION

The present invention relates to a method and an arrangement for anchoring an object at a distance from a support structure and, more particularly, to the secure mounting of an object to a low-strength support structure, such as a porous masonry wall or a block-type structure having interior hollow cavities, by filling an anchoring hole formed in the support structure with a hardenable substance.

In general, the prior art has encountered very serious difficulties when it is desired to mount an object, such as a cladding panel or a radiator, onto a low-strength support structure such as a wall. It is generally known in the prior art to insert a sleeve-shaped dowel or anchoring member into a large-sized hole which has been provided in the support structure and which has been already filled with a hardenable bonding substance, such as a quick-setting cement mixture, before hardening has occurred. After hardening has occurred in this prior-art approach, a mounting screw is screwed into an interior bore of the dowel in order to mount an object to the support structure.

However, the prior-art techniques have not proven altogether satisfactory. The known techniques are suitable only for fastening objects to the ground or to base plates; that is, only those cases in which the hardenable substance is prevented by gravity from flowing out of the anchoring hole before the substance has hardened. Upon insertion of a dowel after the anchoring hole has been filled with cement, the still soft cement tends to flow therefrom and will smear the exterior of the support structure. Thus, the known methods are particularly unsuitable for mounting objects to vertical walls and/or ceilings.

In addition, the known prior-art methods entail the risk, particularly in those cases where an object is to be mounted at a distance from a support structure, that the dowel will sink down into the still soft cement mixture due to its own inherent weight. To prevent this undesired change in position, the prior art requires one to manually hold the dowel in position until the cement mixture has set, or to use expensive holding devices. For example, in the case of the large-scale manufacture of precast concrete parts, the dowels are held in place by spikes arranged on sheeting boards, the spikes projecting into the interior bore of the dowels for a time sufficient for the cement mixture to set. These additional requirements are, of course, costly both in terms of labor and materials.

SUMMARY OF THE INVENTION

Accordingly, it is the general object of the present invention to overcome the disadvantages of the prior art.

An additional object of the present invention is to securely anchor an object at a distance from a support structure, particularly to vertical walls and/or ceilings, by injecting a hardenable substance into an anchoring hole.

A further object of the present invention is to prevent the outflow of the hardenable substance from the anchoring hole.

Still another object of the present invention is to reliably position an object at a predetermined distance from the support structure and to effectively hold the object in place at the selected predetermined distance.

In keeping with these objects and others which will become apparent hereinafter, one feature of the invention resides in providing an anchoring hole in a support structure which has a mounting surface. An anchoring member having a leading anchoring portion which is slightly smaller than the anchoring hole is inserted therein so that a clearance is formed in the anchoring hole about the exterior of the anchoring portion. A trailing elongated mounting portion of the anchoring member is permitted to extend outwardly of the hole beyond the mounting surface. A cap member is mounted in the anchoring hole and about the anchoring member so as to fix the latter in position in the anchoring hole. A flow-through passage which is in communication with the clearance is provided on at least one of the cap and/or anchoring members. Moreover, a hardenable substance is injected through the flow-through passage and from there into the clearance so as to securely anchor an object to the support structure upon the hardening of the substance.

The feature of the cap member permits one to close the clearance and to aid in preventing outflow of the still-fluid substance. This is especially desirable in mounting objects to vertical walls and/or ceilings. Simultaneously, the cap member centers the anchoring member in position and holds it in this position, because the cap member is slightly larger than the anchoring hole and is thus frictionally wedged therein. Thus, it is no longer necessary to hold the anchoring member in position until the substance has hardened.

Also, in accordance with the invention, a flange portion is provided on the cap member to serve as a limiting stop and to prevent the cap member from being introduced too far into the anchoring hole during the initial insertion or during the injection process by the pressure force exerted by the injection device.

The cap member is preferably constituted of resilient synthetic plastic material so as to facilitate its secure mounting in the hole and to compensate for any unevenness occurring at the mouth of the hole. In order to improve the resilience of the cap member, an annular groove may be provided in the flange portion of the cap member.

Yet another feature of the invention resides in mounting the object on the mounting portion of the anchoring member at any of a plurality of locations spaced lengthwise of the mounting portion. A positioning element or nut having an interior thread threadedly engages the rear end region of the mounting portion which is formed with an exterior thread. The positioning element is moved on the rear end region until the object is positioned at a predetermined distance from the support structure. Thereupon, a holding element or nut having an interior thread threadedly engages the exterior thread formed about the rear end region of the mounting portion. The holding element is spaced axially of the positioning element and is operative for holding the object in place at a selected predetermined distance. The pair of elements may either engage opposite sides of the object to be mounted, or the elements may engage each other. In the latter case, the holding element is preferably provided with a holding groove which receives a portion of the object to be mounted, such as a radiator fin.

Still another feature of the invention is embodied in a protective sleeve which is located intermediate the cap member and the positioning element. The protective sleeve has opposite end regions each of which is in sealing engagement with the cap member and positioning element, respectively. The function of the protective sleeve is primarily to protect the metallic anchoring member from the effects of corrosion. In addition, the sleeve also serves to insulate the metallic anchoring member from the effects of heat.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
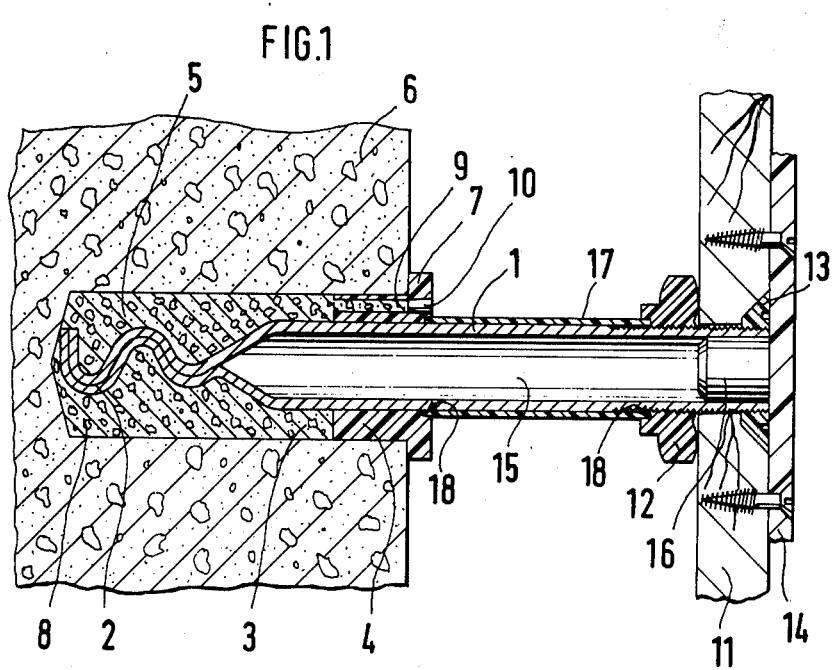
FIG. 1 is a partial view in vertical section of the arrangement according to the present invention.

Referring jointly to the method and the arrangement for mounting an object at a distance from a support structure having an anchoring hole, it will be seen that, in FIG. 1, reference numeral 1 identifies an anchoring member or dowel 1 which is slightly smaller than the anchoring hole 5 formed in the support structure 6. The dowel 1 has a front leading end 2 which is squashed flat and is bent in the form of a hook or barb in order to increase the anchorage effect. The dowel 1 also has a sleeve-shaped leading anchoring portion located adjacent the leading end 2 and a trailing elongated mounting portion which extends outwardly of the hole 5 beyond the vertical mounting surface of the support structure or wall 6.

A cap member 4 is mounted in the hole 5 and about the dowel 1 and closes the clearance or hollow room 3 formed in the hole 5 about the exterior of the dowel 1. The cap 4 has a sleeve-shaped body portion preferably having a larger diameter than the hole 5 so as to frictionally wedge the cap 4 therein without marring the interior surface of the hole 5, thereby fixing the dowel 1 in position in the hole 5 so that an object may be anchored to the structure 7 at any time.

The cap 4 has a trailing end provided with a flange portion 7 which engages the outer mounting surface of the wall 6, and thereby limits the extent of insertion of the cap 4 into the hole 5.

A flow-through passage 9 is provided on the cap 4 so as to provide communication between the clearance 3 and the exterior of the support structure 6. A pressurized injection device, not illustrated, having a conically-shaped nozzle is inserted into the flow-through passage 9 and is operative for injecting a hardenable substance 8 therethrough, under pressure, into the clearance 3 so that the substance 8 forms a plug about the leading anchoring portion and fixes the dowel 1 in the hole 5 upon hardening of the substance 8. Details of the pressurized injection device are entirely conventional and are known to those skilled in the art. For reference purposes, details of such a pressurized injection device can be found by reference to the application having Serial No. 616,072 filed by the applicant on September 23, 1975.

A stopper 10 is insertable into the passage 9 in order to close the open end thereof from the exterior of the wall 6. Alternatively, any analogous closure device, such as resilient valve flaps which normally close the passage in relaxed condition, may be employed.

In order to mount an object, such as cladding panel 11, on the mounting portion at any of a plurality of locations spaced along the length of the elongated mounting portion, a positioning element or nut 12 is mounted for movement lengthwise on the mounting portion. The positioning nut 12 has an interior thread which threadedly engages an exterior thread formed about a trailing end region of the mounting portion. One side of the positioning nut 12 engages a side of the object 11 and positions the same at a predetermined distance from the wall 6.

A holding element or nut 13 also is formed with an interior thread which threadedly engages the exterior thread of the mounting portion. The holding nut 13 engages the opposite side of the object 11 and is operative for clamping and securely holding the object in place at the aforesaid predetermined distance. It is desirable if the side of the holding element 13 which faces away from the object 11 is shaped so as not to extend outwardly beyond the outer side of the object 11. Preferably, the element 13 is countersunk in the object 11. In order to insure a flush-type mounting, the trailing end of the mounting portion may be planed, if necessary, to lie substantially in the same plane as the outer end of the element 13 if the trailing end of the mounting portion projects beyond the object 11 after the latter has been positioned in a desired location. This feature permits a facing plate 14 to be screwed flush with the object 11 in a substantially flat orientation. If a stopper 16 is used to close the interior passage or bore 15 of the dowel, then the outer end of the stopper must also be located so that it does not extend beyond the outer side of the object 11.

A protective sleeve 17 surrounds a major portion of the mounting portion so as to protect the same from the effects of corrosion and heat. The opposite axial end regions of the sleeve 17 are received in respective annular recesses 18 formed in both the cap 4 and the positioning nut 12. A seal is thereby formed between the synthetic plastic material members, namely the cap 4, the sleeve 17 and the positioning nut 12, and the metallic dowel 1. In addition, the sleeve-shaped configuration of the protective sleeve also increases the strength and rigidity of the arrangement and permits the mounting portion to carry still heavier loads.

Figure 2:
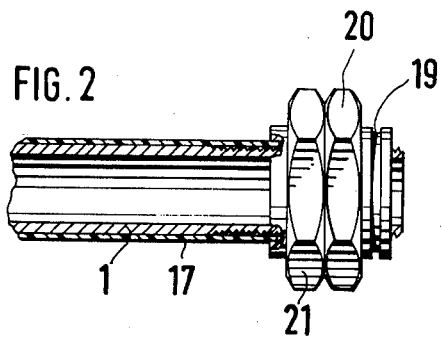
FIG. 2 is a partial side view in vertical section of the arrangement according to another embodiment of the invention.

In FIG. 2, a modification of a detail of the arrangement of FIG. 1 is illustrated which is especially useful for mounting radiators to a support structure. In accordance with the invention, positioning nut 21, which is generally analogous to nut 12, is positioned at a desired distance from a wall. A holding nut 20 is formed with a circular holding groove 19 into which a portion of a radiator, such as a radiator fin or blade, is received. The nuts 20 and 21 are brought into tight engagement with each other so that the radiator can be securely mounted to the wall.

Figure 3:
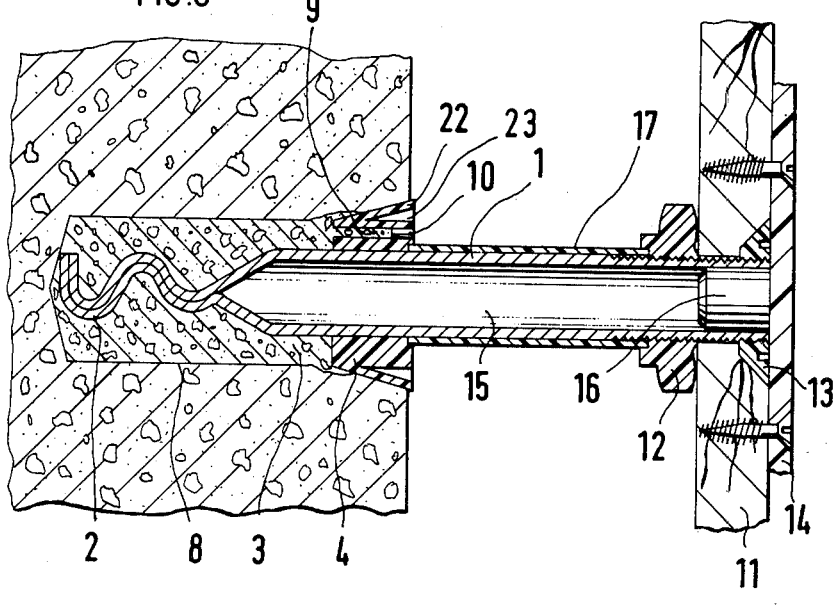
FIG. 3 is a partial side view in vertical section of a modified arrangement of the embodiment of FIG. 1.

FIG. 3 is generally analogous to the embodiment illustrated in FIG. 1. The major difference resides in the configuration of the cap member 4. A resilient sealing lip 22 surrounds an annular groove 23 which is concentric with the interior sleeve-shaped body portion of the cap. The cap 4 thereby has a generally conical configuration which now permits high tolerances to be easily compensated. In case the mouth of the anchoring hole is fractured or broken away, then the trailing tapered end region of the conical cap which is configurated so as to have a larger diameter than the hole is inserted therein and is effective for compensating for any unevenness or tolerance build-up at the hole mouth.

Figure 4:
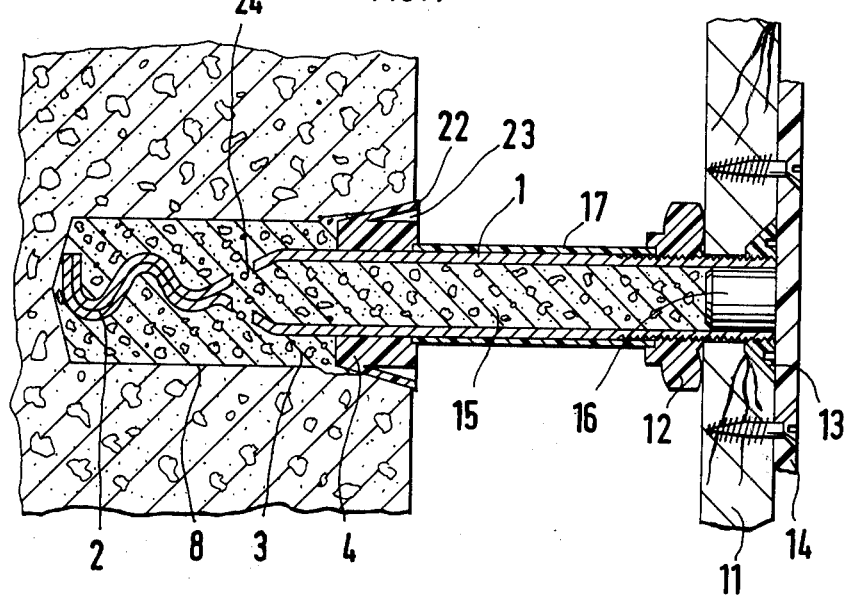
FIG. 4 is a partial side view in vertical section of a modified arrangement of the embodiment of FIG. 3.

Finally, as for FIG. 4, this embodiment is generally reminiscent of the embodiment illustrated in FIGS. 1 and 3, and like numerals identify analogous parts. The major difference resides in the fact that the cap 4 is not provided with any flow-through passage, such as the passage previously identified by reference numeral 9. Instead, the flow-through passage is constituted by the interior bore 15 of the dowel. Communication between the passage 15 and the clearance 3 is provided by the opening 24 at the leading end 2 of the dowel.

Thus, a pressure injection device having a preferably conically-shaped nozzle is inserted into the open end of passage 15 and is operative for injecting a hardenable substance 8, under pressure, respectively through the passage 15, the opening 24 and the clearance 3. In contrast to the previously-described embodiment, the interior passage 15 is now filled with hardenable substance so that a reinforced core is formed when the substance 8 hardens. This feature greatly increases the capability of the dowel to withstand large bending moments.

In accordance with the invention, an object can be mounted onto a support in all possible orientations since the cap effectively seals the anchoring hole from outflow of the still soft hardenable substance. Also, the cap effectively centers the anchoring member and fixes its position in the hole. Moreover, the flange portion of the cap not only aids the anchoring member in carrying still heavier loads but also prevents the cap from being pushed too far into the hole by the pressure forces exerted during operation of the injection device.

Aside from the corrosion and heating protection offered by the protective sleeve 17, the stoppers 10 and 16 also serve to seal the interior of the arrangement with respect to the ambient atmosphere. If desired, the rear portions of the stoppers can also be furnished with a protective cover or layer.

In a further modification of the arrangement, the mounting portion is provided with a circumferential embossed groove. This characteristic leads to a further stiffening of the cross-section of the anchoring member and thereby increases the capability of the arrangement to withstand heavy loads.

It will be understood that each of the elements described above, or two or more together, may also find a useful application in other types of constructions differing from the types described above.

While the invention has been illustrated and described as embodied in a method and arrangement for mounting an object at a distance from a support structure, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An arrangement for mounting an object at a distance from a support structure, particularly a low-strength structure having a mounting surface and an anchoring hole, comprising an anchoring member having a leading anchoring portion for insertion into said hole with clearance, and a trailing elongated mounting portion extending outwardly of said hole in a predetermined orientation relative thereto beyond said mounting surface upon insertion; means for fixing said anchoring portion in said hole, including means for admitting a hardenable substance into said clearance so as to form a plug about the exterior of said anchoring portion and thereupon fix the anchoring member in position in said hole upon hardening of the substance, and a cap member mounted in said hole and having a cover part which overlies and seals said hole from escape of hardenable substance, and a retaining part which surrounds and retains the anchoring member in said orientation so as to hold the anchoring member against displacement out of said orientation by gravity while said substance is hardening; and means for mounting an object on said mounting portion at any of a plurality of locations spaced lengthwise of said mounting portion, said mounting means comprising means for positioning the object at a predetermined distance from the support structure and means for holding the object in place at a selected predetermined distance.

2. An arrangement as defined in claim 1, wherein said anchoring portion has a front end region comprised of hook-shaped curved portions.

3. An arrangement as defined in claim 1, wherein said anchoring portion is smaller than said hole so that said clearance is formed in said hole about the exterior of said anchoring portion, and wherein said cap member is mounted in said clearance and engages said anchoring member so as to fix the latter in position in said hole; and further comprising a flow-through passage provided on at least one of said members and being in communication with said clearance; and further comprising a plug surrounding said anchoring portion and filling said clearance, said plug being constituted of a hardenable substance injected through said passage by an injection device so as to anchor said anchoring portion in said hole upon hardening of the substance.

4. An arrangement as defined in claim 1, wherein said cap member has a tubular body portion and an annular, radially-extending flange portion for abutting against surface portions of the mounting surface of the support structure which bounds said hole, said flange portion being of one piece with said body portion.

5. An arrangement as defined in claim 1, wherein said mounting portion has a rear end region formed with an exterior thread; and wherein said positioning means comprises a positioning element in threaded engagement with said exterior thread, and wherein said holding means comprises a holding element also in threaded engagement with said exterior thread and spaced axially of said positioning element.

6. An arrangement as defined in claim 5, wherein said elements engage opposite sides of the object to be mounted and are constituted of synthetic plastic material.

7. An arrangement as defined in claim 5, wherein said holding element has one side provided with a holding groove for receiving a portion of an object to be mounted, and another side in engagement with said positioning element.

8. An arrangement as defined in claim 1, wherein said positioning means comprises a positioning element spaced lengthwise of said mounting portion relative to said cap member; and further comprising a protective sleeve located intermediate said cap member and said positioning element and having opposite end regions in respective sealing engagement with said cap member and said positioning element.

9. An arrangement as defined in claim 1, wherein said mounting portion has a hollow interior and an open end; and further comprising means for closing said open end, said closing means comprising a plug member received in said hollow interior of said mounting portion and mounted in flush engagement with the object.

10. An arrangement as defined in claim 1, wherein said cap member has a body portion formed with an annular groove, and resilient sealing lip means surrounding said groove and engaging the hole mouth for sealing the latter.

11. An arrangement as defined in claim 1, wherein said cap member has a conical configuration.

12. An arrangement as defined in claim 3, wherein said anchoring member has a hollow interior and an open end, and wherein said flow-through passage extends lengthwise through said interior of said anchoring member so that said plug also fills said hollow interior by injection of the hardenable substance through said open end and forms a reinforced core upon hardening of the substance.

13. An arrangement as defined in claim 1, wherein said mounting portion has an annular reinforcing groove.

14. A method of mounting an object at a distance from a support structure, particularly a low-strength structure having a mounting surface, comprising the steps of providing an anchoring hole in the support structure; inserting a leading anchoring portion of an anchoring member into said hole with clearance for a depth sufficient to permit an elongated trailing mounting portion of said anchoring member to extend outwardly of the hole beyond said mounting surface in a predetermined orientation relative to the hole; fixing said anchoring portion in said hole by admitting a hardenable substance into said clearance to thereby form a plug about the exterior of said anchoring portion and fix the anchoring member in position in the hole upon hardening of the substance; retaining said anchoring member in said orientation by mounting a cap member in said hole and about the anchoring member so as to hold the latter against displacement out of said orientation by gravity while said substance is hardening; positioning the object at a predetermined distance from the support structure by mounting the object on the mounting portion at any of a plurality of locations spaced lengthwise of the latter, and holding the object at a selected predetermined distance.

15. A method as defined in claim 14; and further comprising the step of forming said clearance in said hole about the exterior of said anchoring portion by inserting an anchoring portion of smaller size than said hole; and wherein said step of fixing is performed by mounting said cap member in engagement with said anchoring member so as to fix the latter in position in said hole; and the step of providing a flow-through passage on at least one of said members which is in communication with said clearance; and the step of injecting a hardenable substance through said passage and from there into said clearance so that the hardenable substance forms a plug about said anchoring portion and fixes the anchoring member in said hole upon hardening of the substance.

16. A method as defined in claim 14, wherein said steps of positioning and holding the object are performed by moving displaceable elements lengthwise of said mounting portion.

* * * * *